United States Patent
Eom et al.

(10) Patent No.: US 10,574,476 B2
(45) Date of Patent: Feb. 25, 2020

(54) METHOD AND APPARATUS OF MANAGING GUEST ROOM

(71) Applicant: SAMSUNG ELECTRONICS CO., LTD., Suwon-si, Gyeonggi-do (KR)

(72) Inventors: Chungyong Eom, Seoul (KR); Apoorv Kansal, Suwon-si (KR); Yunho Park, Suwon-si (KR); Yoseong Song, Suwon-si (KR); Subyeong Oh, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 337 days.

(21) Appl. No.: 15/338,982

(22) Filed: Oct. 31, 2016

(65) Prior Publication Data

US 2017/0126419 A1    May 4, 2017

(30) Foreign Application Priority Data

Oct. 29, 2015 (KR) .................. 10-2015-0150744

(51) Int. Cl.
*H04L 12/28* (2006.01)
*H04L 12/413* (2006.01)
*G05B 15/02* (2006.01)
*G05B 19/048* (2006.01)
*G06F 16/2457* (2019.01)

(52) U.S. Cl.
CPC ............ *H04L 12/282* (2013.01); *G05B 15/02* (2013.01); *G05B 19/048* (2013.01); *H04L 12/413* (2013.01); *G05B 2219/2642* (2013.01); *G06F 16/2457* (2019.01)

(58) Field of Classification Search
CPC .............. G05B 15/02; G05B 19/048; G05B 2219/2642; G06F 16/2457; H04L 12/282; H04L 12/413
See application file for complete search history.

(56) References Cited

U.S. PATENT DOCUMENTS

| | | | |
|---|---|---|---|
| 2003/0061077 A1* | 3/2003 | Sagar .................. | G06Q 10/02 705/5 |
| 2003/0149576 A1* | 8/2003 | Sunyich .............. | G06Q 10/02 705/5 |
| 2008/0155429 A1 | 6/2008 | Frank et al. | |
| 2010/0191551 A1 | 7/2010 | Drance et al. | |
| 2011/0302607 A1* | 12/2011 | Warrick ............. | H04L 12/2809 725/39 |

(Continued)

FOREIGN PATENT DOCUMENTS

| | | |
|---|---|---|
| CA | 2 709 651 | 12/2010 |
| JP | 2004-503884 | 2/2004 |
| KR | 10-2014-0100374 | 8/2014 |

OTHER PUBLICATIONS

Search Report dated Jan. 18, 2017 in counterpart International Patent Application No. PCT/KR2016/012412.

(Continued)

*Primary Examiner* — Kim T Nguyen
(74) *Attorney, Agent, or Firm* — Nixon & Vanderhye P.C.

(57) ABSTRACT

Certain example embodiments relate to a method and/or apparatus for managing a guest room, and for example, for assigning a guest room based on customized setting information provided by a user and thereafter managing the guest room based on the setting information.

16 Claims, 10 Drawing Sheets

(56) References Cited

U.S. PATENT DOCUMENTS

2011/0314502 A1* 12/2011 Levy .................. H04N 7/106
  725/46
2013/0197674 A1 8/2013 Lowry

OTHER PUBLICATIONS

Extended Search Report dated Jun. 11, 2018 in counterpart European Patent Application No. 16860347.0.

* cited by examiner

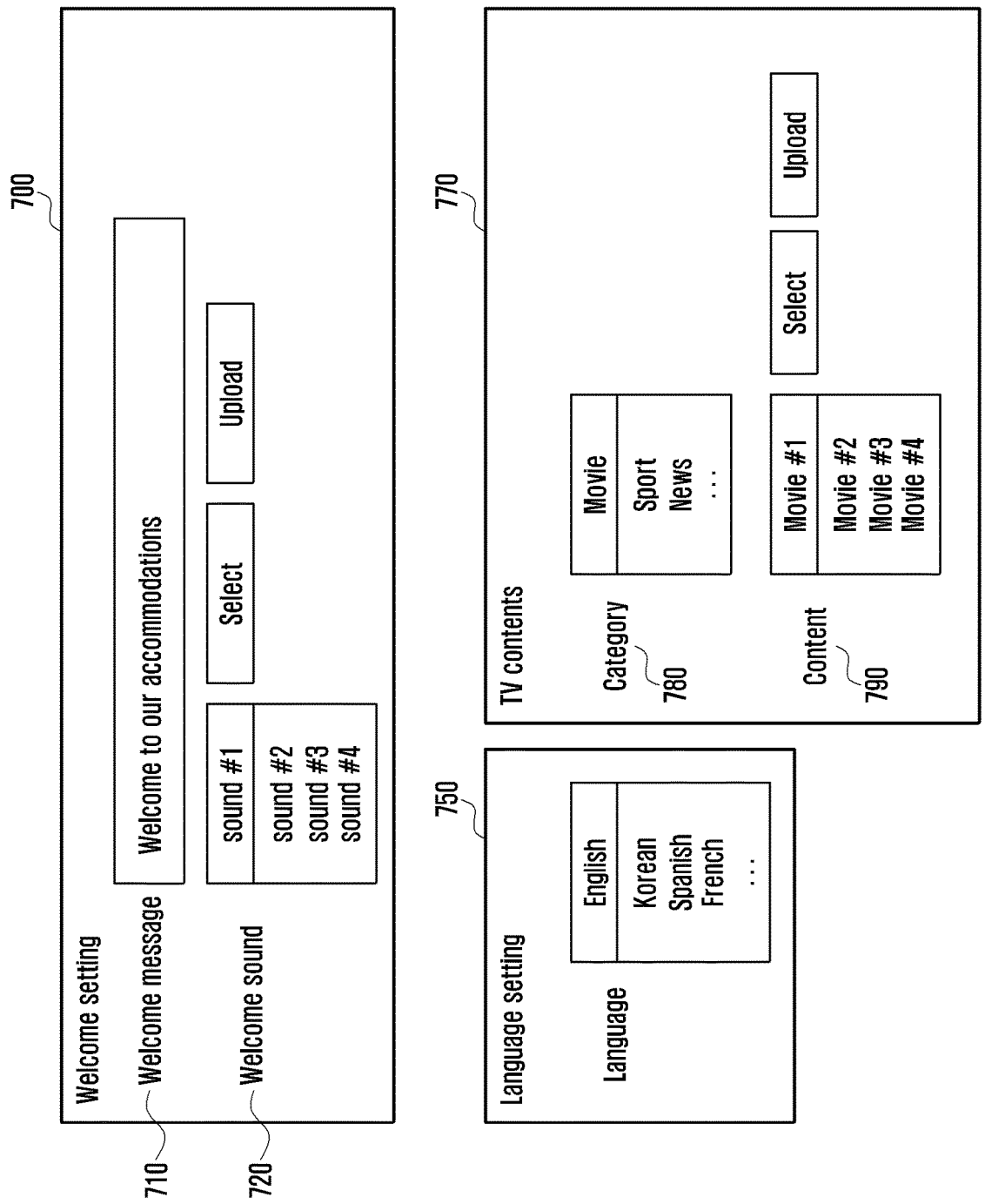

FIG. 8

Food and beverage (800)

Preferred food  ○  | Korean food #1 | | Japanese food #1 |  ○  | Western food #1 |
                   | Korean food #2 |   | Japanese food #2 |     | Western food #2 |
                   | Korean food #3 |   | Japanese food #3 |     | Western food #3 |

Beverage  ○  | Beverage #1 |
             | Beverage #2 |
             | Beverage #3 |

Delivery time  | HH:MM |

Vegetarian  | Not applicable | Semi vegetarian | Strict vegetarian |

Baby care (810)

The number of babies  | 1 |     Age  | 3 | years of age

Morning call (820)

Morning call time  | HH:MM |

Life convenience facility (830)

Select life convenience facility
☐ | Facility #1 |   ☐ | Facility #2 |   ☐ | Facility #3 |
☐ | Facility #4 |   ☐ | Facility #5 |   ☐ | Facility #6 |

METHOD AND APPARATUS OF MANAGING GUEST ROOM

CROSS-REFERENCE TO RELATED APPLICATION

This application is based on and claims priority under 35 U.S.C. § 119 to a Korean patent application filed on Oct. 29, 2015 in the Korean intellectual property office and assigned serial number 10-2015-0150744, the disclosure of which is incorporated by reference herein in its entirety.

TECHNICAL FIELD

The present disclosure relates generally to a method and an apparatus of managing a guest room, and for example, to a method and an apparatus of setting environment of a guest room and providing a service to a user.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications. Meanwhile, lodging business generally stands for business that charges a fixed rental fee and rents a guest room. Conventionally, the accommodations have provided the same guest room environment to users who use a plurality of guest rooms. That is, the accommodations basically provide uniform environment and services to all users without considering each user preference. However, there may be specific requirements, or the like depending on user's propensity. Therefore, a user has trouble in manually requesting his/her requirements. To solve the problem, a customizing method of reflecting customer preferences for guest room environment, provided services, or the like is required.

SUMMARY

Accordingly, example embodiments of the present disclosure provide a method of extracting, by a server, setting factors that may be set by users, based on user information, Another example aspect of the present disclosure is to provide a method of controlling guest room environment allocated to users and providing services to the users, using values for extracted setting factors that are preset by the users, setting information based on use history information of the users, or the like.

Various example embodiments of the present disclosure provide a method of managing a guest room of a server in a guest room management system, including: extracting at least one guest room setting factor based on user information received from a terminal; transmitting information associated with the extracted guest room setting factor to the terminal; receiving setting information on the setting factor from the terminal; and managing the guest room based on the setting information.

Various example embodiments of the present disclosure provide a method of supporting a guest room of a terminal in a guest room management system, including: transmitting user information to a server; receiving information associated with at least one guest room setting factor extracted from the server based on the user information; and transmitting setting information on the guest room setting factor to the server.

Various example embodiments of the present disclosure provide a server for managing a guest room in a guest room management system, including: a transceiver configured to transmit and receive information to and from a terminal; and a controller configured to extract at least one guest room setting factor based on user information received from the terminal, to transmit information associated with the extracted guest room setting factor to the terminal, to receive setting information on the setting factor from the terminal, and to manage the guest room based on the setting information.

Various example embodiments of the present disclosure provide a terminal for supporting guest room management in a guest room management system, including: a transceiver configured to transmit and receive information to and from a server; and a controller configured to transmit the user information to the server, to receive information associated with at least one guest room setting factor extracted from the server based on the user information, and to transmit setting information on the guest room setting factor to the server.

BRIEF DESCRIPTION OF THE DRAWINGS

These and other aspects, advantages and attendant features of the disclosure will become more readily apparent from the following detailed description, taken in conjunction with the accompanying drawings, in which like reference numerals refer to like elements, and wherein:

FIG. 7 is a diagram illustrating an example user interface setting TV contents according to an example embodiment of the present disclosure;

FIG. 8 is a diagram illustrating an example user interface setting a guest room service according to an example embodiment of the present disclosure;

DETAILED DESCRIPTION

Figure 1:
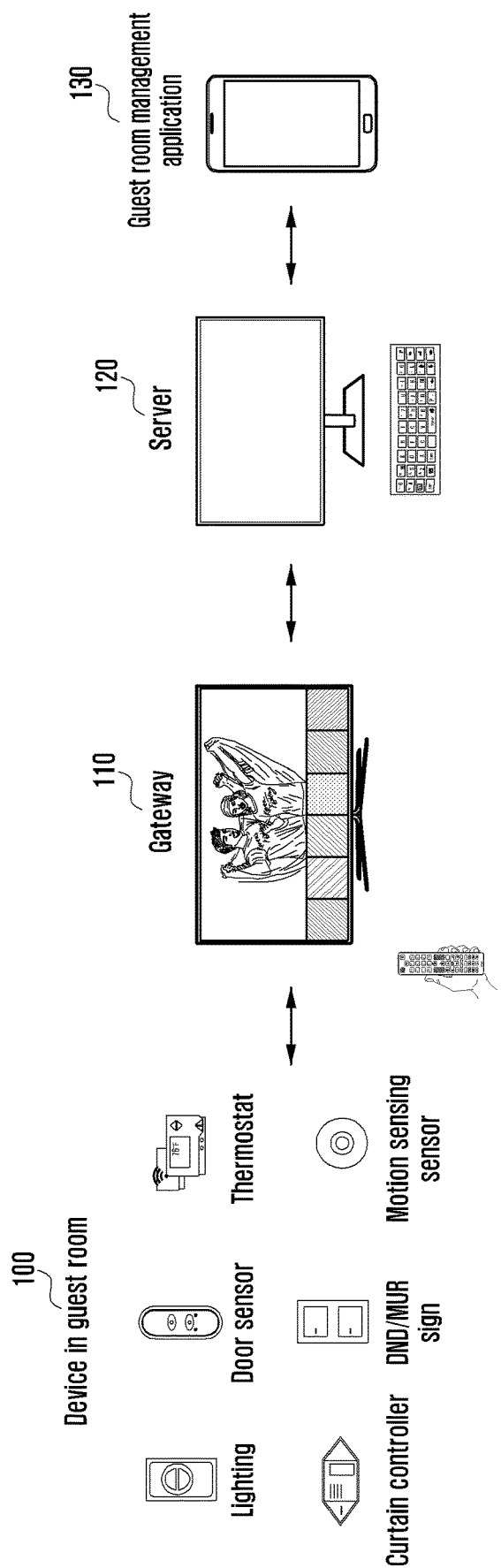
FIG. 1 is a diagram illustrating an example configuration of a system of managing a guest room.

Hereinafter, example embodiments of the present disclosure will be described in detail with reference to the accompanying drawings.

In describing the example embodiments of the present disclosure in the present disclosure, a description of technical contents which are well known to the art to which the present disclosure belongs and are not directly connected with the present disclosure will be described. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description with reference to the accompanying drawings. However, the present disclosure is not limited to the example embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the disclosure denote like elements.

In this case, it may be understood that each block of processing flow charts and combinations of the flow charts may be performed by computer program instructions which, when executed by at least one processor, cause the processor to perform the operations of the instructions. Since these computer program instructions may be installed in processors of a general computer, a special computer, or other programmable data processing apparatuses, these computer program instructions executed through the process of the computer or the other programmable data processing apparatuses perform functions described in block(s) of the flow chart. Since these computer program instructions may also be stored in a computer usable memory or a computer readable memory or other programmable data processing apparatuses that may direct a computer or other programmable data processing apparatuses in order to implement functions in a specific scheme, the computer program instructions stored in the computer usable memory or the computer readable memory may also produce manufacturing articles including instructions for performing the functions described in the block(s) of the flow chart. Since the computer program instructions may also be installed in a computer or other programmable data processing apparatuses, they perform a series of operation steps on the computer or the other programmable data processing apparatuses to create processes executed by the computer, such that the computer program instructions executing the computer or the other programmable data processing apparatuses may also provide steps for performing the functions described in the block(s) of the flow chart.

In addition, each block may indicate some of modules, segments, or codes including one or more executable instructions for executing a specified logical function(s). Further, it is to be noted that functions mentioned in the blocks may be performed regardless of a sequence in some alternative embodiments. For example, two blocks that are shown in succession may be simultaneously performed in fact or may be sometimes performed in a reverse sequence depending on corresponding functions.

Here, the term '~unit' used in the present embodiment may refer, for example, to software or hardware (e.g., circuitry) components such as processing circuitry, FPGA and ASIC, or the like, and the '~unit' performs any roles. However, the meaning of the '~unit' is not limited to software or hardware. The '~unit' may be configured to be in a storage medium that may be addressed and may also be configured to reproduce one or more processor. Therefore, as an example, '~unit' includes components such as software components, object oriented software components, class components, and task components, processes, functions, attributes, procedures, subroutines, segments of a program code, drivers, firmware, a microcode, a circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more CPUs within a device or a security multimedia card.

FIG. 1 is a diagram illustrating an example configuration of a system of managing a guest room.

For example, the system of managing a guest room may include at least one device in a guest room 100, a gateway 110, a server 120, and a room management application 130.

The device in a guest room 100 may refer, for example, to a device connected to the gateway 110 and may include a communication module including communication circuitry. The device in a guest room 100 may use various communication circuitry to perform various communication methods, such as, for example, and without limitation, near field communication to be connected to the gateway 110. The near field communication may include, for example, and without limitation, at least one of Bluetooth, wireless fidelity (WIFI), WIFI-Direct, Zigbee, and near field communication.

The gateway 110 may refer, for example, to a device that is located within a guest room of accommodations to be connected to the device in a guest room 100 and a server 120 to manage, control, and monitor guest room environment. For example, the gateway 110 may receive setting information from the server 120 to control the devices in a guest room 100. Further, the gateway 110 may provide TV contents to a user based on TV contents setting information included in the setting information. The gateway 110 may be individually installed and one of the devices 100 in a guest room serves as the gateway 110. FIG. 1 illustrates an example in which a TV in a guest room serves as the gateway 110, but the present disclosure is not limited thereto.

The server 120 may refer, for example, to a server of accommodations and may receive setting information, etc., required to manage a guest room and transmit the setting information to each of the management systems. For example, when the server 120 receives customizing values for guest setting factors from a user terminal, the server 120 may transmit the setting information based on the customizing values to a room management system (RMS), a property management system (PMS), and a contents management system (CMS) depending on characteristics for each guest room setting factors. That is, the server 120 may transmit guest room environment setting information to the room management system, transmit service setting information to the property management system, and transmit TV contents setting information to the contents management system.

The guest room management application 130 may be connected to the room management system (RMS) that monitors a guest room state, environment, or the like within accommodations and thus a staff of accommodations may be used to manage a guest room. For example, the room management application 130 may display a guest room state for each guest room, that is, check in/out, do not disturb (DND), and make up room (MUR). In addition, the guest management server RMS may receive the guest room environment setting information that a user inputs and transmit the received guest room environment setting information to the gateway 110, thereby controlling the guest room environment, or the like.

Figure 2:
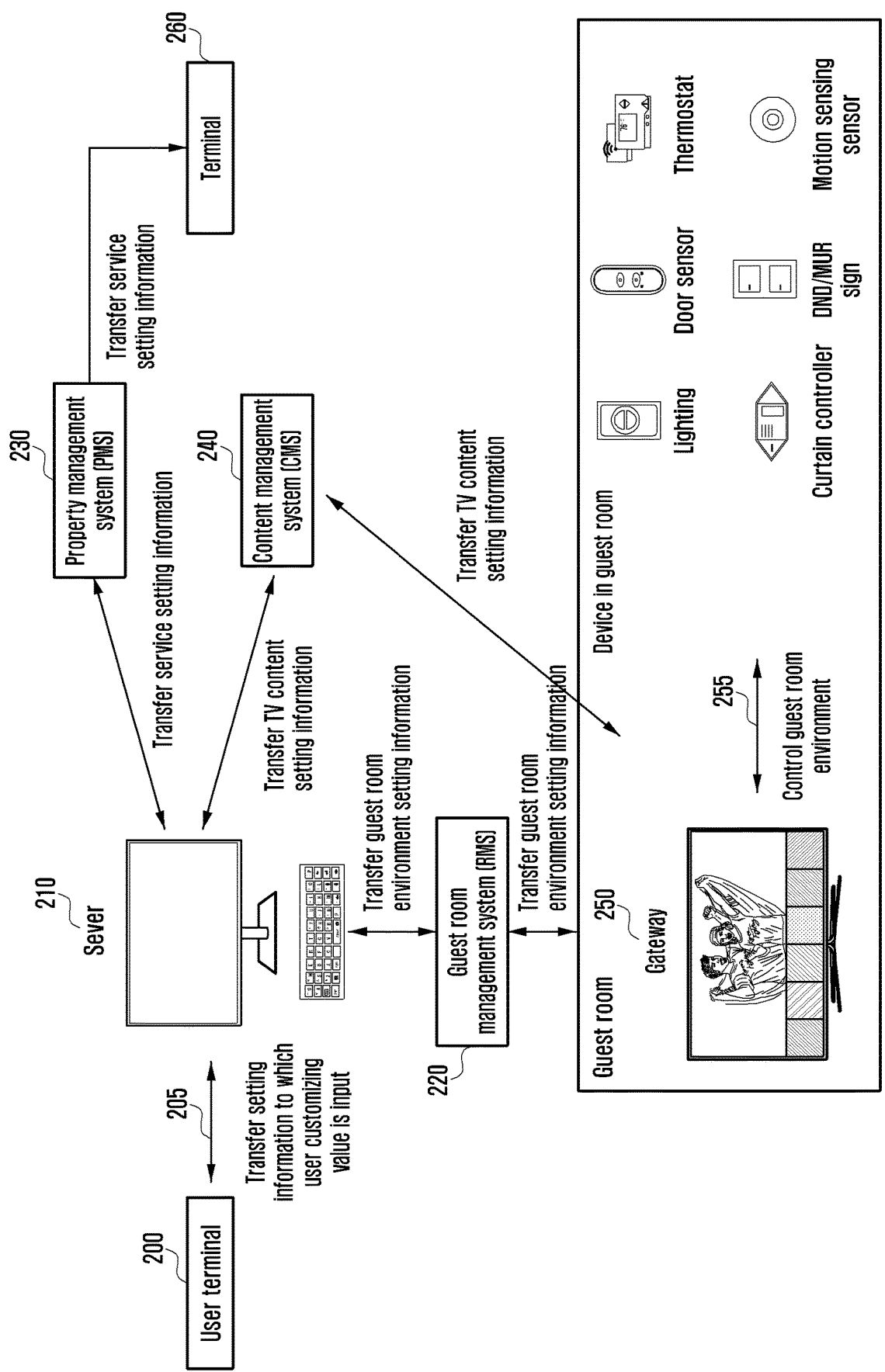
FIG. 2 is a diagram illustrating an example process of transferring a message transmitted and received between components providing customizing services according to an example embodiment of the present disclosure.

FIG. 2 is a diagram illustrating an example process of transferring a message transmitted and received between components providing customizing services according to an example embodiment of the present disclosure.

For example, FIG. 2 illustrates an example method of distributing and transmitting, by a server, customizing values received from a user of a guest room and providing a service based on the customizing values.

The user terminal 200 may transmit setting information on setting factors including a customizing value 205 to a server 210. According to an example embodiment of the present disclosure, the user terminal 200 may optionally receive the guest room setting factors from the server 210. The user terminal 200 may receive the customizing values for the guest room setting factors configured by the server 200 and transmit the feedback information thereon. The user terminal 200 may configure the customizing values based on home related information receive from a home server and transmit the configured customizing values to the server 210. Each of the example embodiments will be described below in greater detail. The guest room setting factor and the setting information may be configured as the following Table 1. The guest setting factor and the setting information illustrated in the following Table 1 correspond to an example determined for managing the customizing guest room but the present disclosure is not limited thereto.

TABLE 1

| Category | Setting factor | Setting information |
|---|---|---|
| Personal information | Age | 10~twenties/30~forties/fifties~ |
| | The number of guests | At least 1/2/3 persons |
| | Stay period | Lodge for day/week/long term |

TABLE 1-continued

| Category | Setting factor | Setting information |
|---|---|---|
| Guest room environment setting | Temperature | ° C./° F. |
| | Humidity | Relative humidity (%) |
| | Illumination | Illuminance (0~255), Color (RGB), Scene (mode) |
| | Curtain | Open/Close, Brightness(0~100) |
| | Fine dust | ($\mu g/m^3$) |
| TV contents setting | Welcome message/music | Input message/input music data |
| | Channel | Channel list |
| | Contents | Contents list (movie/sport/news . . . ) |
| | TV application on/off schedule | Preferred application list on time/off time |
| | Volume | 0~100 |
| Service setting | Convenience facility | |
| | Guest service indicator | do not disturb (DND), make up room (MUR), no service (NOSVC) |
| | Morning call alarm time | Alarm time |
| | Babysitting | Request time |
| | Washing | Washing history information, clothing information |
| | Fitness | Body state information |
| | Food/beverage | Preferred food/beverage list |
| | Concierge | Business/tour guide, or the like |
| | Valet parking | |
| | Escort | Location information received from user terminal |

The server 210 may transmit the setting information including the customizing values for the setting factors that are received from the user to each management system. The server 210 may transmit the guest environment setting information to the room management system (RMS) 220. The room management system may refer, for example, to a system that controls and manages the guest room environment setting. The guest room environment setting may include setting temperature, humidity, illumination, curtain, fine dust, or the like, for example. The room management system 220 may transmit the received guest room environment setting information to a gateway 250 in a guest room associated with a user. Next, the gateway 250 may control a device in a guest room 250 based on the received environment setting information to control guest room environment 255.

Further, the server 210 may transmit the service setting information to a property management system (RMS) 230. The property management system 230 may transmit the service setting information to a staff terminal 260 of the corresponding guest room. The staff terminal 260 may display the received service setting information. As shown in the above Table 1, the service setting may include setting convenience facility, room service, morning call, baby care, washing, fitness, food/beverage, concierge, valet parking, and escort service, for example.

Further, the server 210 may transmit the TV contents setting information to a contents management system (CMS) 240. The contents management system 240 stands for management of a contents service provided through the TV of the corresponding guest room. As illustrated in the above Table 1, the setting of the TV contents may include setting welcome message/music, channel, contents, TV application, on/off schedule, and volume, for example. The contents management system 240 may transmit the received TV contents setting information to the gateway 250 in a guest room. The gateway 250 may control the TV depending on the received TV contents setting information. As described above, when the TV in a guest room serves as the gateway 250, the operation of the TV may be performed depending on the TV contents setting information immediately received. Alternatively, when separate devices in a guest room serve as the gateway 250, the devices may transmit the TV contents setting information to the TV and operate the TV.

As described in FIG. 2, the terms "the property management system, the contents management system, and the guest room management system" may be replaced by the terms of other devices that perform the operation of the present disclosure as described above, but are not limited thereto. According to the embodiment of the present disclosure, the user inputs the customizing value to the setting information of the preset factor to increase inconvenience of receiving the wanted environment of a guest room, a service, or the contents of the TV without manually requesting them.

Several example embodiments in a process of inputting or configuring customizing values as described above will be described.

Figure 3:
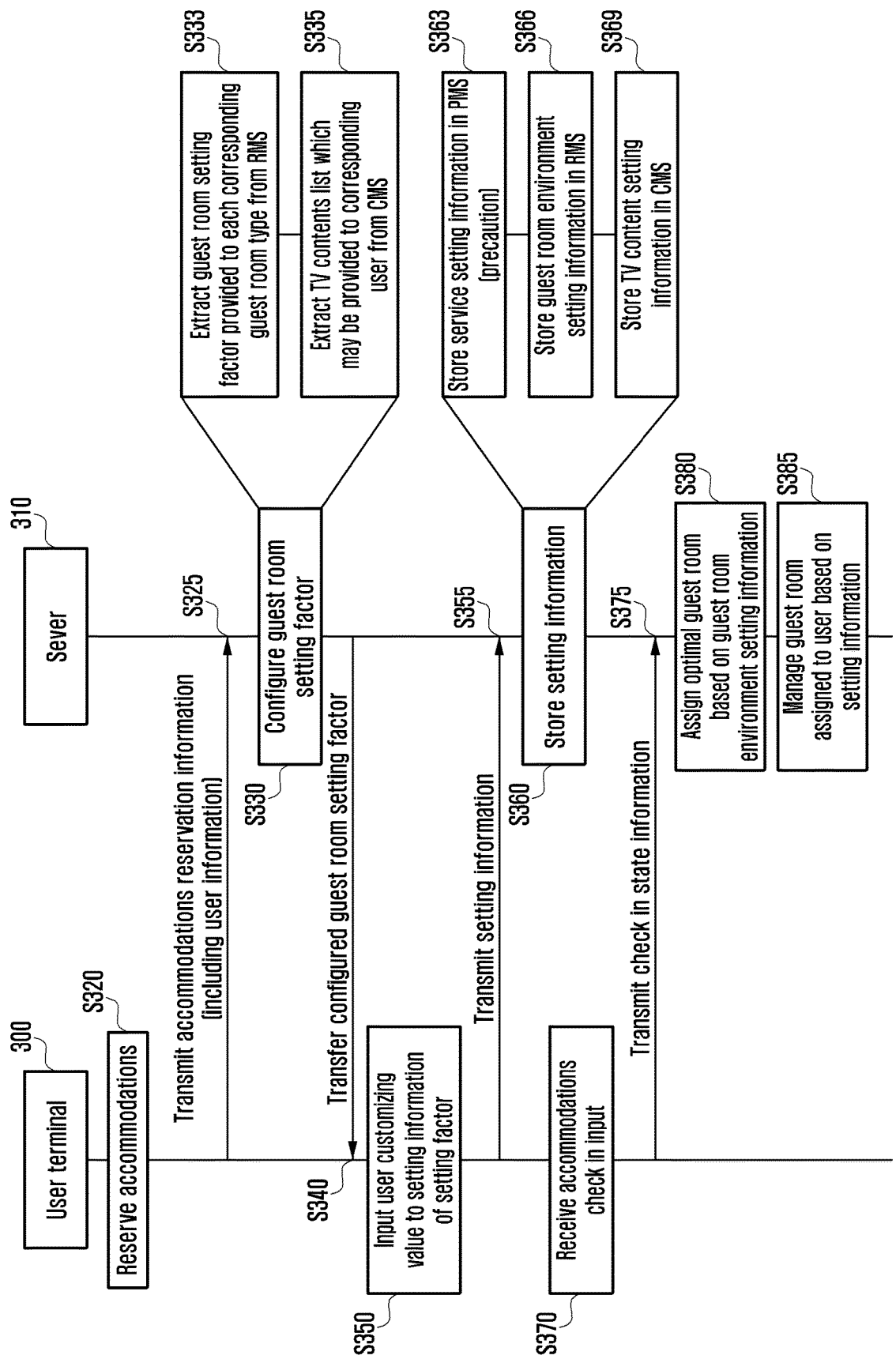
FIG. 3 is a diagram illustrating an example method of managing a guest room based on a customizing value that is directly input by a user according to an example embodiment of the present disclosure.

FIG. 3 is a diagram illustrating an example method of managing a guest room based on a customizing value for a setting factor that is directly input by a user according to an example embodiment of the present disclosure.

A user terminal 300 may perform a reservation process of accommodations (S320). For example, the user terminal 300 accesses a hotel server and may receive reservation information of a user required for reservation from a user. The user terminal 300 may transmit the received reservation information of the user to the server 310 (S325). The reservation information may include information on age, the number of guests, stay period, or the like. The server 310 may configured the guest setting factor based on the received reservation information (S330). The configuration of the guest setting factor may be embodied as follows. For example, the server 310 may extract the guest setting factors that may be provided for each guest type from the room management system (RMS) (S333). For example, the server 310 may extract the guest room setting factors based on guest room templates for each guest room type that is designed and stored in advance. Components of the guest room templates may include an area and the devices in a guest room. The area may include attributes of an area name, a location, and an area size and the device may include a device name, a location, a device state, and a control function.

Further, the server may extract the TV contest list that may be provided to the corresponding user from the contents management system (CMS) (S335). For example, the server 310 may extract the TV contents list that may be provided based on the information on the guest room type or whether to pay additional fees. Further, the server 310 may extract the TV contents list that may be further provided under the condition that additional fees are paid to a user.

The server 310 may transmit the configured guest room setting factors to the user terminal 300 (S340). The user terminal 300 may display the information on the guest room setting factors on a screen and receive the customizing values for the setting information on the guest room setting factors (S350). A form of the input setting information is described in the above Table 1. Further, the setting information may be classified into the information on the service setting, the guest room environment setting information, and the TV contents setting information depending on the category of the quest room setting factors.

The user terminal 300 may transmit the setting information, to which the customizing values are input, to the server 310 (S355). The server 310 may store the setting information to which the received customizing values are input (S360). In this example, the server 310 may in detail classify the customizing values, which are the user setting information, depending on the category of the guest room setting factors and store it. For example, the server 310 may store the service setting information in the property management system (PMS) (S363). Further, the server 310 may store the guest room environment setting information in the room management system (RMS) (S366). Further, the server 310 may store the TV contents setting information in the contents management system (CMS) (S369).

When the user does a check in, the user terminal 300 may receive a check in input from a user (S370). The user terminal 300 may transmit check in state information to the server 310 (S375). The server 310 may assign an optimal guest room based on the information included in the guest room environment setting information (S380). For example, the server 310 may selectively assign a guest room having environment closest to the temperature based on temperature information included in the guest room environment setting information.

The server 310 may manage a guest room assigned based on the setting information (S385). In more detail, the property management system may transmit the stored service setting information to a staff terminal to provide a service. Further, the guest room management system may control the device in a guest room assigned based on the guest room environment setting information. Further, the contents management system may control an operation of the TV based on the TV contents setting information.

Further, the server may manage a guest room by additionally considering the input setting information while using the guest room after the check in, as well as the setting information transmitted before the check in. The server 310 may use the pre-stored setting information as a basic value to preferentially process the setting information input in real time. According to the embodiment of the present disclosure, the guest room setting factor is configured and thus the customizing value is input to the user setting information, such that the setting values for the setting factors that may be basically set may be input in advance. The method of managing a guest room based thereon may solve a problem of a request for resolving user's inconvenience in real time when the user feels inconvenience of the guest room environment or the service.

Figure 4:
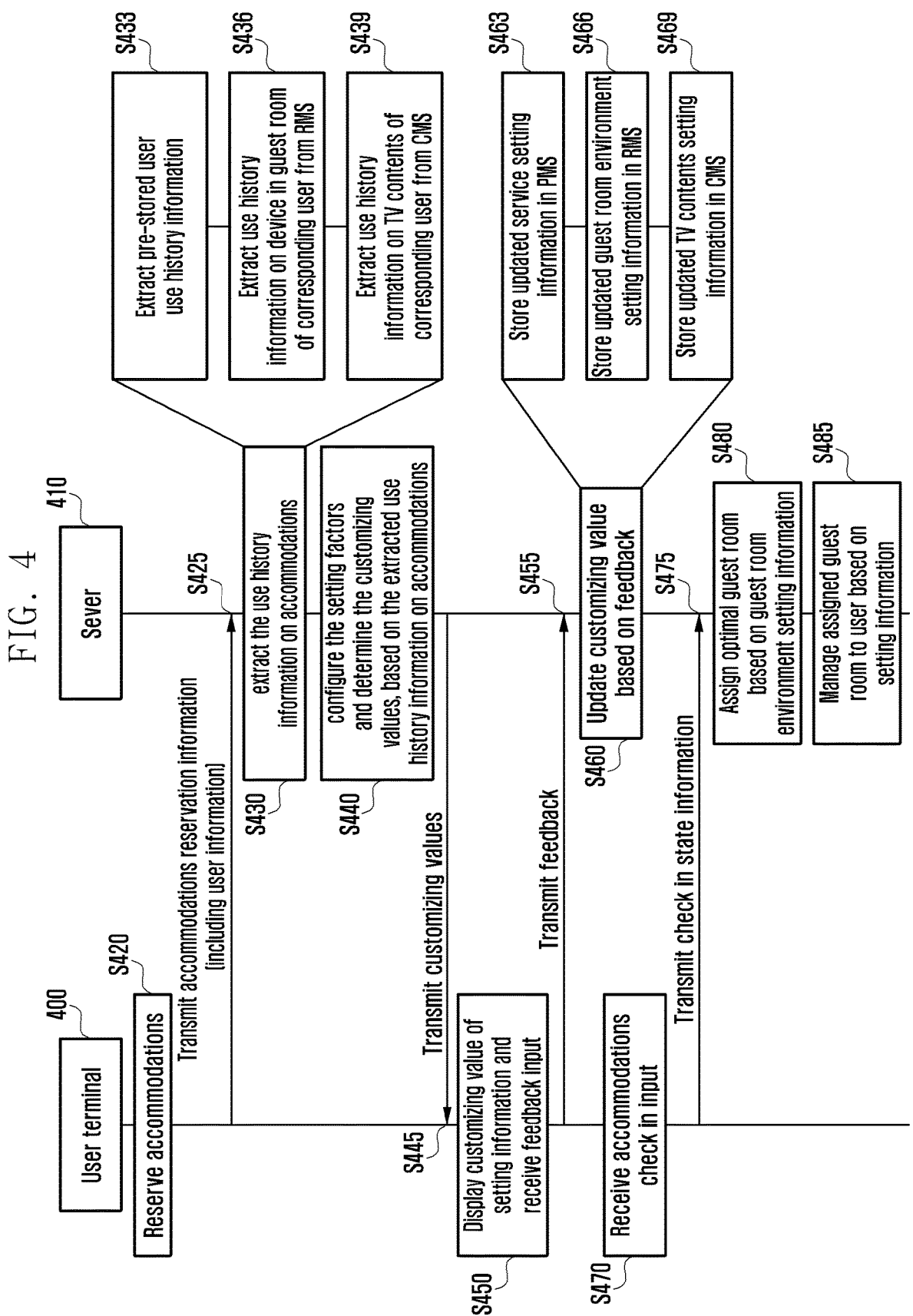
FIG. 4 is a diagram illustrating an example method of managing a guest room based on a customizing value determined by extracting use history information of a user on accommodations according to another example embodiment of the present disclosure.

FIG. 4 is a diagram illustrating an example method of managing a guest room based on a customizing value determined by extracting use history information of a user on accommodations according to another example embodiment of the present disclosure.

A user terminal 400 may perform a reservation process of accommodations (S420). For example, the user terminal 400 accesses a hotel server and may receive reservation information of a user required for reservation from a user. The user terminal 400 may transmit the received reservation information of the user to the server 410 (S425). The reservation information may include information on age, the number of guests, stay period, or the like. The server 410 may extract the use history information on accommodations based on the received reservation information (S430).

For example, the server 410 may extract the use history information of a user on accommodations, which is stored in the server 410 in advance, based on the received reservation information (S433). The use history information on accommodations may include use history information on other accommodations having a chain relationship with user accommodations as well as including accommodations that a user currently uses. When the use history information on other accommodations is extracted, characteristics of other accommodations, for example, climatic characteristics, or the like may be additionally considered.

Further, the server 410 may extract use history information on a device in a guest room of the corresponding user from the guest room management system (S436). The server 410 may extract the use history information on the TV contents of the corresponding user from the contents management system (S439). The server 410 may configure the setting factors and determine the customizing values, based on the extracted use history information (S440). The server 410 may transmit the customizing values (S445).

The user terminal 400 may display the received customizing values and receive a feedback input from the user (S450). The feedback input may refer, for example, to whether to agree the customizing values determined based on the use history information in the server 410. Further, when the user does not agree the customizing value determined based on the use history information, the user may use the user terminal 400 to input a new customizing value. The user terminal 400 may transmit the received feedback input to the server 410 (S455).

The server 410 may update the customizing value for the setting information based on the received feedback (S460). In this example, the server 410 may classify the customizing values, which are the user setting information, depending on the category of the guest room setting factors and store it. For example, the server 410 may store the updated service setting information in the property management system (PMS) (S463). Further, the server 410 may store the updated guest room environment setting information in the room management system (RMS) (S466). Further, the server 410 may store the updated TV contents setting information in the contents management system (CMS) (S469).

When the user does a check in, the user terminal 400 may receive a check in input from a user (S470). The user terminal 400 may transmit the check in state information to the server 410 (S475). The server 410 may assign an optimal guest room based on the information included in the guest room environment setting information (S480). For example, the server 410 may selectively assign a guest room having environment closest to the temperature based on temperature information included in the guest room environment setting information.

The server 410 may manage a guest room assigned based on the setting information (S485). For example, the property management system may transmit the stored service setting information to a staff terminal to provide a service. Further, the guest room management system may control the device in a guest room assigned based on the guest room environment setting information. Further, the contents management system may control an operation of the TV based on the TV contents setting information.

According to the embodiment of the present disclosure, the server determines the customizing value depending on the user history information previously using the same accommodations or accommodations connected as a chain, and thus the user may manage a guest room by reflecting comfort and preference. For example, when a user does not know detailed values for temperature, humidity, or the like that he/she may feel, the user may refer to the use history information, or the like of devices in a guest room.

Figure 5:
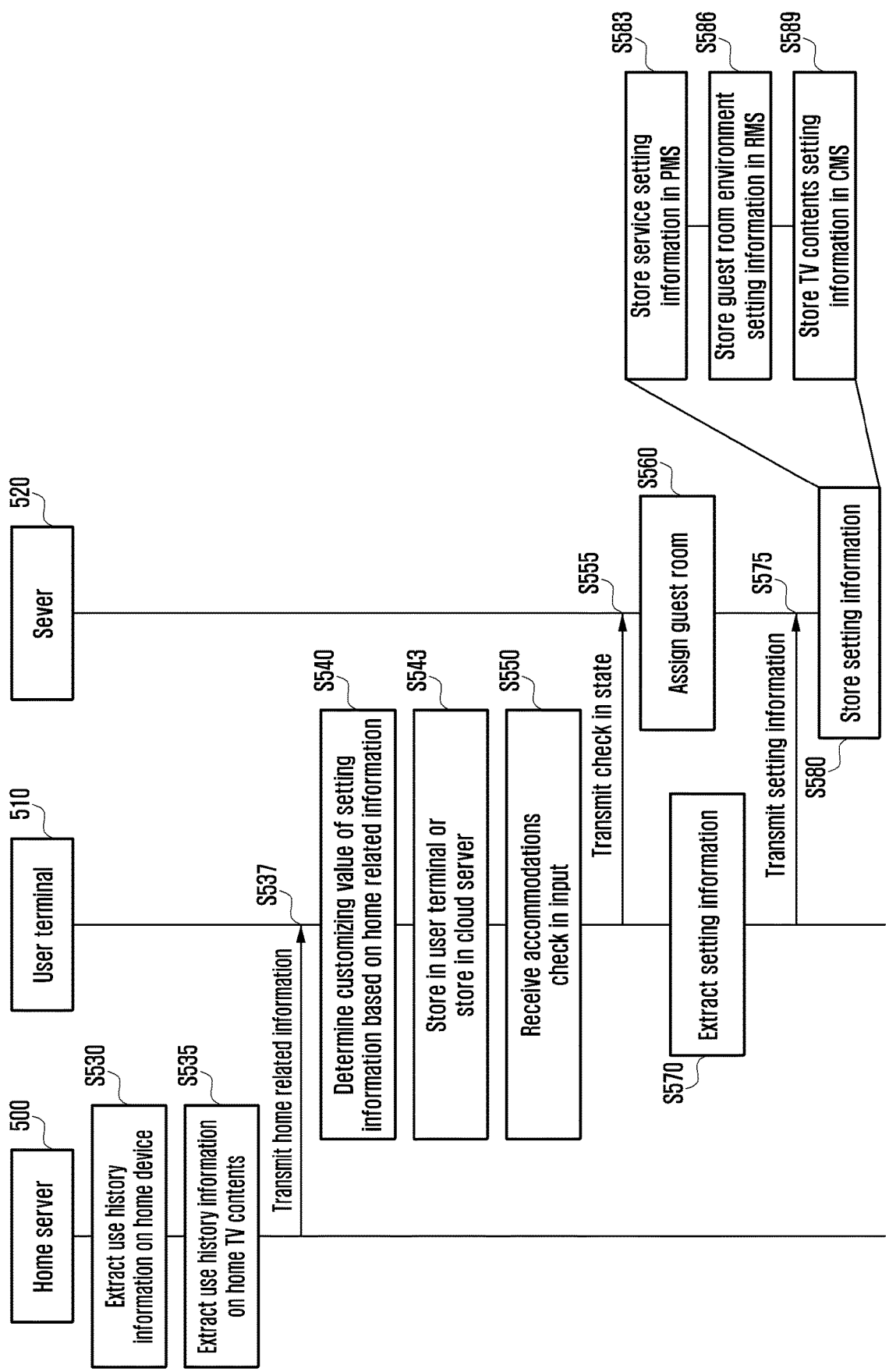
FIG. 5 is a diagram illustrating an example method of managing a guest room based on a customizing value determined by extracting history information within a user's house according to another example embodiment of the present disclosure.

FIG. 5 is a diagram illustrating an example method of managing a guest room based on a customizing value determined by extracting history information within a user's house according to another example embodiment of the present disclosure.

For example, as compared with FIG. 3, a user terminal 510 may determine the customizing value based on the home related information received from the home server, instead of directly inputting the customizing values for the setting information of the setting factors after receiving the setting factors from a server 520.

The home server 500 may extract use history information on a home device corresponding to the user from the pre-stored information (S530). The home server may collect and store the use history information on devices in house in a server of a user house. The home server 500 may be connected to the user terminal 510 to transmit the collected use history information. The home server 500 may extract the use history information on the home TV contents corresponding to the user (S535). The home server 500 may transmit the extracted home related information to the user terminal 510 (S537). The user terminal 510 may determine the customizing value of the setting information based on the home related information (S540).

The user terminal 510 may store the detected customizing value information in, for example, the user terminal or a cloud server (S543). The cloud server is a server that provides a cloud computing service to the user terminal 500 and provides computing resource requested by the user terminal 500 through the Internet.

When the user does a check in, the user terminal 500 may receive the check in input from a user (S550). The user terminal 500 may transmit the check in state information to the server 510 (S555). The server 520 may assign a guest room to the user (S560).

The user terminal 510 may extract the setting information on the setting factors pre-stored in the user terminal or the cloud server (S570). The user terminal 510 may transmit the setting information to the server 520 (S575).

The server 510 may store the received setting information (S580). In this case, the server 510 may in detail classify the customizing values, which are the user setting information, depending on the guest room setting factors and store it. For example, the server 510 may store the service setting information in the property management system (PMS) (S583). Further, the server 510 may store the guest room environment setting information in the room management system (RMS) (S586). Further, the server 510 may store the TV contents setting information in the contents management system (CMS) (S589). The server 510 may manage a guest room based on the setting information.

FIG. 5 illustrates a method of assigns a guest room to a user terminal 510 to extract setting information and managing a guest room. However, the present disclosure may include an example of performing the reservation process of accommodations before a check in as illustrated in FIG. 3, extracting the setting information determined based on the home related information, and assigning, by the server 520 receiving the check in state, a guest room to the user based on the setting information. According to the present disclosure, the user may store and accumulate the history information used in the house in the user terminal or the cloud server and thus use the stored and accumulated history information for the guest room management to reflect the user comport and preference, thereby managing the guest room.

Figure 6:
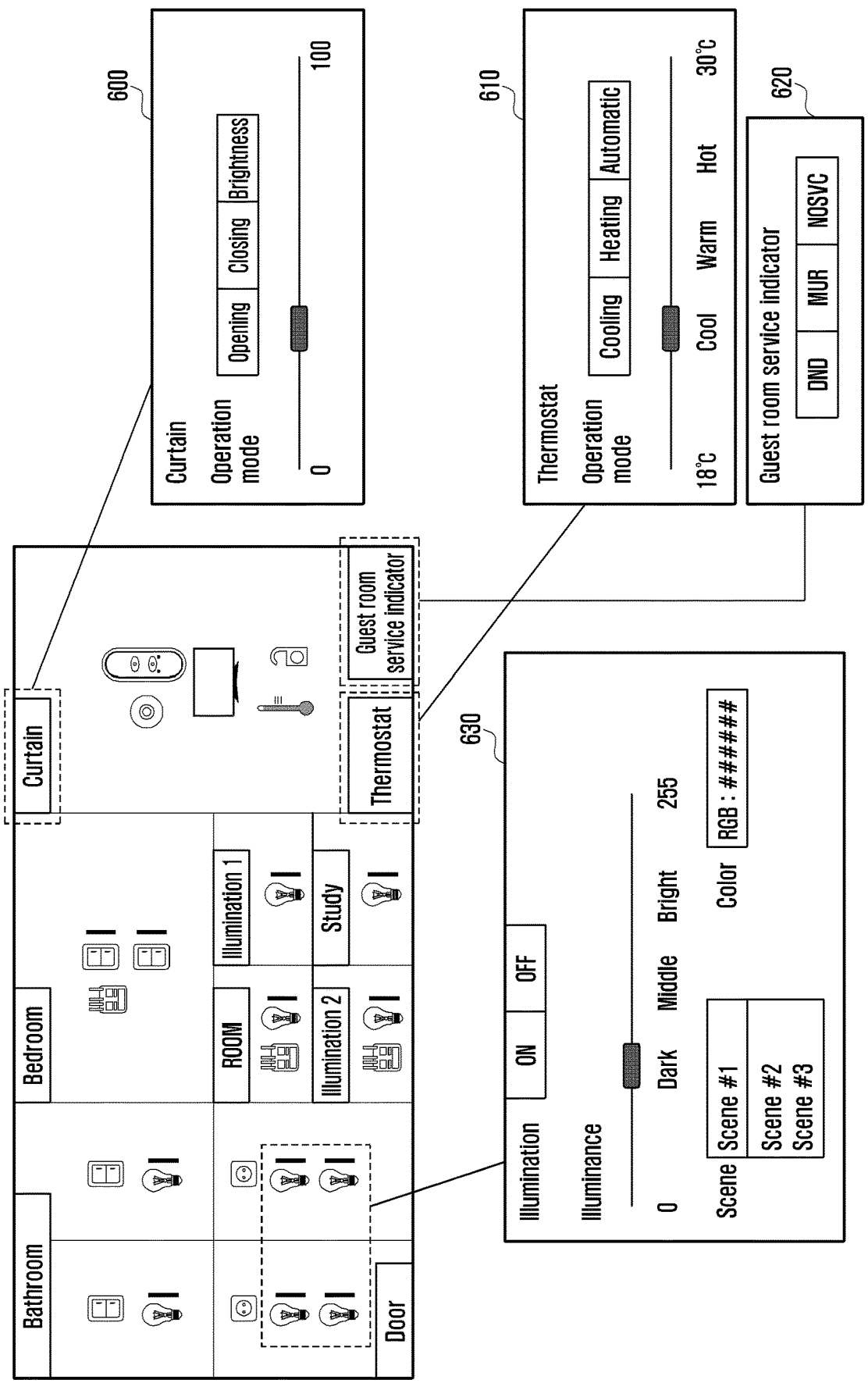
FIG. 6 is a diagram illustrating an example user interface (UI) setting guest room environment according to an example embodiment of the present disclosure.

FIG. 6 is a diagram illustrating an example user interface (UI) setting guest room environment according to an example embodiment of the present disclosure.

For example, FIG. 6 illustrates a user interface displayed on a user terminal to allow the user to input the environment setting information using a template of the guest room described above. For example, FIG. 6 illustrates the user interface used to input the customizing values to the setting information on the setting factors shown in the above Table 1.

The user may select the devices in a guest room, which are displayed on the user terminal, to input the customizing values for the devices in a guest room. For example, when the user inputs an operation of selecting a curtain, the user terminal may display a window through which a customizing value may be input to curtain setting information (600). The curtain setting information may include opening, closing, or brightness.

Further, the user terminal may display a window through which a customizing value may be input to thermostat setting information when the user input an operation of selecting components for the thermostat (610). The setting of the thermostat may select one of driving modes, for example, a cooling mode, a heating mode, and an automatic mode. Further, the setting of the thermostat may be input by selecting more detailed temperature. Further, the user terminal may display the window through which guest room service indicator setting information may be input, when the user inputs an operation of selecting components for the guest room service indicator (620). The setting of the guest room service indicator may include, for example, DND, MUR, and NOSVC.

Further, when the user inputs an operation of selecting components for illumination, the user terminal may display a window through which a customizing value may be input to illumination setting information (630). The setting of the illumination may include a power supply that may turn on/off illumination, illuminance setting, scene setting, and color setting.

FIG. 7 is a diagram illustrating an example user interface setting TV contents according to an example embodiment of the present disclosure.

For example, FIG. 7 illustrates a user interface displayed on a user terminal to allow a user to input the TV contents setting information described above. For example, FIG. 7 illustrates the user interface used to input the customizing values to the TV contents setting information on the setting factors shown in the above Table 1.

The user terminal may display a screen that may set a welcome screen (700). The welcome screen may refer, for example, to the screen that is displayed on TV as soon as the user turns on the power supply for TV. For example, the user terminal may set a welcome message 710 and a welcome sound 720. When the user selects the welcome sound, one sound may also be selected from the sound list used in advance and a new sound stored in the user terminal may be uploaded.

The user terminal may display a screen that may set a language displayed on the TV (750). Further, the user terminal may display the screen that may set the TV contents (770). For example, a category 780 of the TV contents and a detailed content 790 may be selected. When the user selects the detailed content, one content may also be selected from the content list used in advance and a new content stored in the user terminal may be uploaded.

FIG. 8 is a diagram illustrating an example user interface setting a guest room service according to an example embodiment of the present disclosure.

For example, FIG. 8 illustrates a user interface displayed on a user terminal to allow a user to input the service setting information described above. For example, FIG. 8 illustrates the user interface used to input the customizing values to the service setting information on the setting factors shown in the above Table 1.

The user terminal may display a screen that may set services for food and beverage (800). A user may select food preferred to set services for food and beverage, beverage, food delivery time, and whether the user is a vegetarian through the screen. The user terminal may display a screen that may set babysitting displayed (810). The user may input services, that is, the number of babies and an age of baby, that he/she wants to sign up through the screen. Further, the user terminal may display a screen that may set a morning call service (820). The user may input the morning call time through the screen. Further, the user terminal may display a screen that may set a service for a use of life convenience facilities (830).

Figure 9:
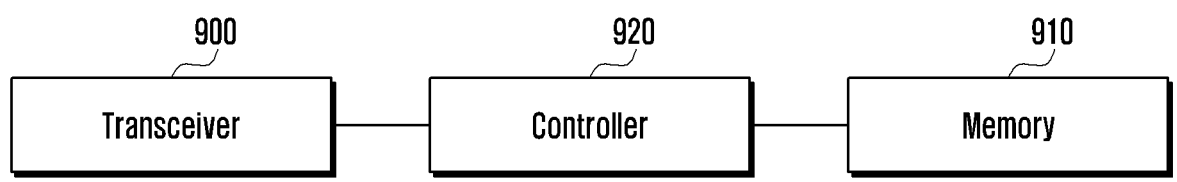
FIG. 9 is a block diagram illustrating an example internal structure of a server according to an example embodiment of the present disclosure.

FIG. 9 is a block diagram illustrating an example internal structure of a server according to an example embodiment of the present disclosure.

For example, the server may include a transceiver (or transmitting and receiving unit) (e.g., including transceiver and/or receiving and transmitting circuitry) 900, a memory (or storage unit) 910, a controller (or control unit) 920. For example, when making reference to a controller in the disclosure, it may be stated that "the controller may be a circuit, an application-specific integrated circuit or at least one processor."

The transceiver 900 may include various circuitry configured to transmit and receive information required for the server to operate the operation according to the present disclosure. The transceiver 900 may transmit the received information to the memory 910 or the controller 920. For example, the transceiver 900 may transmit and receive to and from an apparatus serving as a gateway and a terminal within a guest room. The transceiver 900 may transmit and receive information to and from the property management system (PMS), the contents management system (CMS), and the room management system (RMS) to manage a guest room. The transceiver may receive the user information from the user terminal. Further, the transceiver may receive the setting information to which the customizing value is input from the user terminal. Further, the transceiver 900 may classify the receiving of the setting information depending on each of the corresponding setting factors and transmit the received setting information to each of the management systems.

The memory 910 may store the information required for the server to operate the present disclosure. The memory 910 may store the received user information. Further, the memory 910 may store the stored user information to the controller 920 to extract the guest room setting factors based on the user information. Further, the memory 910 may store the setting information including the customizing value received from the user terminal. Further, the memory 910 may store the use history information of the user on the accommodations associated with the server.

The controller 920 may include various processing circuitry configured to extract at least one guest room setting factor based on the user information received from the user terminal, transmit the information associated with the extracted guest room setting factors to the user terminal, receive the setting information on the setting factors from the user terminal, and manage the guest room based on the setting information. The guest room setting factor may be extracted based on the information on the guest room associated with the user included in the user information. Further, the guest room setting factors are associated with at least one of the guest room environment setting, the provided contents setting in the guest room, and the service setting. The setting information on the setting factors may include at least one of the setting information determined based on the setting information input by the user through the user terminal or the information received from the home server of the user.

The controller 920 may be configured to identify whether there is pre-stored user history information based on the user information and if it is identified that there is the pre-stored user history information, determine the setting information on the setting factors of the guest room based on the user history information and transmit the setting information on the setting factors of the guest room to the user.

Figure 10:
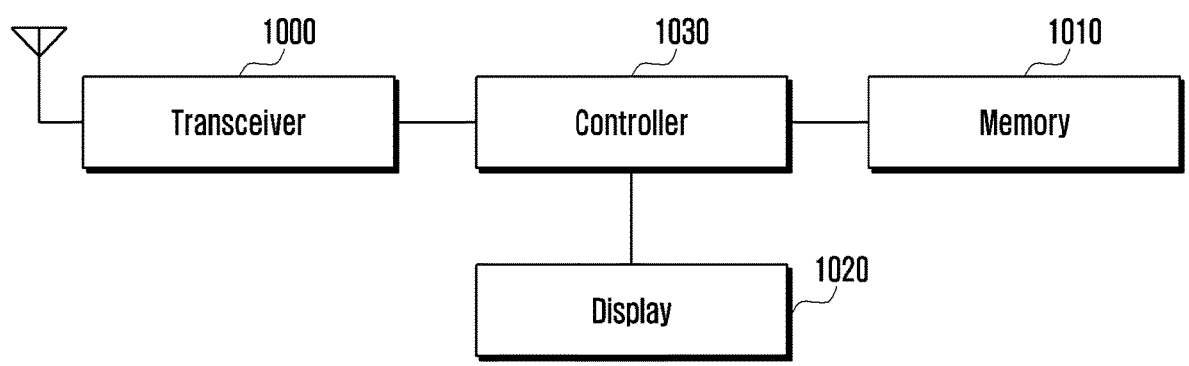
FIG. 10 is a block diagram illustrating an example internal structure of a terminal according to an example embodiment of the present disclosure.

FIG. 10 is a block diagram illustrating an example internal structure of a terminal according to an example embodiment of the present disclosure.

The transceiver 1000 may include various transmission and/or receiver circuitry configured to transmit and receive information required for the terminal to operate the operation according to the present disclosure. The transceiver 1000 may transmit the received information to the memory 1010 or the controller 1030. For example, the transceiver 1000 may transmit the user information received through a touch screen included in the display 1020 to the server. Further, the transceiver 1000 may receive the information associated with the guest room setting factors received from the server. Further, the transceiver 1000 may receive the home related information from the home server associated with the user. Further, the transceiver 1000 may transmit the home related information to the external cloud server.

The memory 1010 may store the information required for the server to operate the present disclosure. The memory 1010 may store the information received by the transceiver 1000. For example, the memory 1010 may store the guest room setting factor received from the server or the home related information received from the home server associated with the user.

The display 1020 may display information required for the terminal to operate the operation according to the present disclosure. Further, the display 1020 may include a touch screen unit that may receive the input from the user. For example, the display 1020 may display the information associated with the guest room setting factor received from the server. Further, the display 1020 may display the information associated with the guest room setting factor on the user interface (UI) based on the guest room template. Further, the display 1020 may receive the customizing values of the setting information on the setting factors from the user using the touch screen.

The controller 1030 may be configured to transmit the user information to the server, receive the information associated with at least one guest room setting factor extracted from the server based on the user information, and to transmit the setting information on the guest room setting factors to the server. The guest room setting factor may be extracted based on the information on the guest room associated with the user included in the user information. The controller 1030 may further be configured to receive the setting information on the setting factors from the user. The controller 1030 may further perform a control to receive the home related history information of the user from the home server and determine the setting information on the setting factors based on the home related history information.

According to the example embodiments of the present disclosure, differentiated experiences are provided to users by providing the guest room setting factors that may be set by the users based on the user information before the users enter the accommodations and controlling the guest room environment and providing services using the set values for the guest room setting factors that are input by the users or the set values determined based on the user history information, thereby increasing the service use satisfaction.

Meanwhile, although the example embodiments of the present disclosure have been illustrated in the present disclosure and the accompanying drawings and specific terms have been used, they are used in a general meaning in order to assist in the understanding the present disclosure and do not limit the scope of the present disclosure. It will be apparent to those skilled in the art to which the present disclosure pertains that various modifications may be made without departing from the scope of the present disclosure, in addition to the example embodiments disclosed herein.

What is claimed is:

1. A method of a server, the method comprising:
   receiving reservation information including user information from a terminal;
   identifying at least one setting factor for a room to be set by the terminal, based on the user information and a room type, the at least one setting factor comprising a parameter that can be set by a user of the terminal;
   transmitting information associated with the at least one setting factor to the terminal;
   receiving setting information on the at least one setting factor from the terminal;
   receiving check-in information from the terminal;
   selecting a room based on the setting information received from the terminal which in turn was based on the at least one setting factor and the information associated with the at least one setting factor that was transmitted from the server to the terminal; and
   managing the selected room based on the setting information.

2. The method of claim 1, wherein the at least one setting factor includes at least one of room environment setting, contents setting, or service setting.

3. The method of claim 1, wherein the setting information on the at least one setting factor is determined based on information stored in a home server to which the terminal is connected.

4. The method of claim 1, wherein receiving the setting information comprises:
   identifying, based on the user information, whether there is pre-stored history information;
   determining the setting information on the at least one setting factors of the room based on the pre-stored history information based on determining that there is the pre-stored history information;
   transmitting the setting information on the at least one setting factor to the terminal; and
   receiving feedback information on the setting information from the terminal.

5. A method of a terminal, the method comprising:
   transmitting, to a server, reservation information including user information;
   receiving, from the server, information associated with at least one setting factor to be set by the terminal, the at least one setting factor being identified based on the user information and a room type and comprising a parameter that can be set by a user of the terminal;

transmitting setting information on the at least one setting factor to the server; and transmitting check-in information to the server, wherein a room is selected based on the setting information received from the terminal which in turn was based on the at least one setting factor and the information associated with the at least one setting factor that was transmitted from the server to the terminal, and wherein the setting information is used to manage the room.

6. The method of claim 5, wherein the at least one setting factor includes at least one of room environment setting, contents setting, or service setting.

7. The method of claim 5, comprising receiving the setting information on the setting factor from a user of the terminal.

8. The method of claim 5, wherein the setting information based on the at least one setting factor is determined based on information stored in a home server to which the terminal is connected.

9. A server, the server comprising:

a transceiver; and a controller coupled with the transceiver and configured to:

receive reservation information including user information from a terminal, identify at least one setting factor to be set by the terminal, based on the user information and a room type, the at least one setting factor comprising a parameter that can be set by a user of the terminal, transmit information associated with the at least one setting factor to the terminal, receive setting information on the at least one setting factor from the terminal, receive check-in information from the terminal, select a room based on the setting information received from the terminal which in turn was based on the at least one setting factor and the information associated with the at least one setting factor that was transmitted from the server to the terminal, and manage the room based on the setting information.

10. The server of claim 9, wherein the at least one setting factor includes at least one of room environment setting, contents setting, or service setting.

11. The server of claim 9, wherein the setting information on the setting factor is determined based on information stored in a home server to which the terminal is connected.

12. The server of claim 9, wherein the controller is configured to identify, based on the user information, whether there is pre-stored history information, determine the setting information on the at least one setting factor of the room based on the pre-stored history information based on determining that there is the pre-stored history information, transmit the setting information on the at least one setting factor to the terminal, and receive feedback information on the setting information from the terminal.

13. A terminal, the terminal comprising:

a transceiver; and a controller coupled with the transceiver and configured to:

transmit, to a server, reservation information including user information, receive, from the server, information associated with at least one setting factor to be set by the terminal, the at least one setting factor being identified based on the user information and a room type, the at least one setting factor comprising a parameter that can be set by a user of the terminal, transmit setting information on the at least one setting factor to the server, and transmit check-in information to the server, wherein a room is selected based on the setting information received from the terminal which in turn was based on the at least one setting factor and the information associated with the at least one setting factor that was transmitted from the server to the terminal, and wherein the setting information is used to manage the room.

14. The terminal of claim 13, wherein the at least one setting factor includes at least one of room environment setting, contents setting, or service setting.

15. The terminal of claim 13, wherein the controller is further configured to receive the setting information on the at least one setting factor from a user.

16. The terminal of claim 13, wherein the setting information on the at least one setting factor is determined based on information stored in a home server to which the terminal is connected.

* * * * *